United States Patent [19]

Domen

[11] Patent Number: 4,714,351

[45] Date of Patent: Dec. 22, 1987

[54] GLOBE MAPS AND DERIVED PRODUCTS

[76] Inventor: Jean-Paul Domen, 75 rue du Moulin Vert, 75014 Paris, France

[21] Appl. No.: 910,500

[22] Filed: Sep. 23, 1986

[51] Int. Cl.[4] .................. G04B 19/26; G04B 19/22
[52] U.S. Cl. ............................................ 368/17; 368/24
[58] Field of Search .................... 368/15–17, 368/21–24

[56] References Cited

U.S. PATENT DOCUMENTS

| | | | |
|---|---|---|---|
| 2,907,166 | 10/1959 | Ballard | 368/24 |
| 3,049,863 | 8/1962 | Ranney | 58/44 |
| 3,370,415 | 2/1968 | McIlvaine | 58/44 |
| 3,516,243 | 6/1970 | Hazard | 58/44 |
| 3,527,046 | 9/1970 | Pawl | 368/24 |
| 3,983,688 | 10/1976 | Kockinos | 58/44 |
| 4,056,927 | 11/1977 | Wilson | 58/44 |
| 4,102,121 | 7/1978 | Veazey | 58/44 |
| 4,357,693 | 11/1982 | Planken et al. | 368/187 |
| 4,477,193 | 10/1984 | Yasufuku | 368/24 |

FOREIGN PATENT DOCUMENTS

| | | |
|---|---|---|
| 8088 | 10/1920 | Austria . |
| 1622963 | 2/1970 | Fed. Rep. of Germany . |
| 1425541 | 12/1965 | France . |
| 1437285 | 3/1966 | France . |
| 2390788 | 8/1978 | France . |
| 1096502 | 12/1976 | United Kingdom . |

Primary Examiner—Vit W. Miska
Attorney, Agent, or Firm—Dodge, Bush & Moseley

[57] ABSTRACT

Globe map (10) in which a light source (76) and a screen (46) cooperate to create on the wall of a shell (12) two hemispherical zones respectively lit and dark. Clockworks designed to rotate these zones around the center of the globe (10), according to the rhythm of the days and years, include a body (32), a polar day shaft (14) rigidly connected to the shell (12) and a year shaft (38) rigidly connected to the screen (46). The axes of the shafts (14 and 38) intersect at the center of the shell (12) along an angle equal to the angle of inclination of the plane of the equator on the ecliptic.

Under nominal working conditions, the screen (46) rotates around the shaft (14) at the rate of one revolution per sidereal day and around the year shaft (38) at the rate of one revolution per tropical year.

An optical device (84) integral with the screen (46) and whose axis coincides with that of the screen cooperates with the source (76), a transparent support (86) including a figure representative of the sun and a circular band (92) integral with the body (32) showing a calendar, for the projection of this figure and a band segment on the wall of the shell (12), so implementing a globe map clock.

12 Claims, 5 Drawing Figures

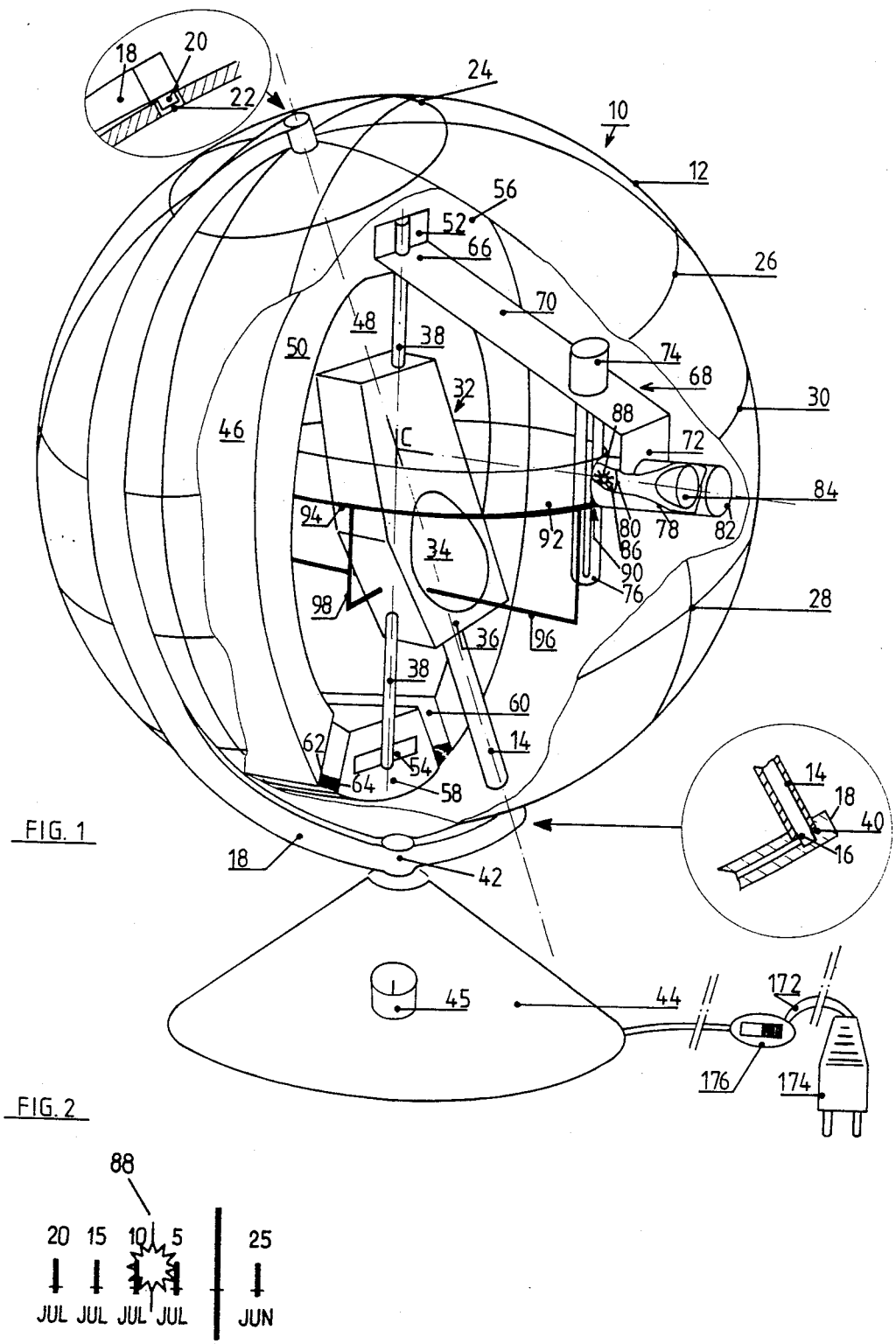

GLOBE MAPS AND DERIVED PRODUCTS

BACKGROUND OF THE INVENTION

1. Field of the Invention

The invention relates to improvements in globe maps used as educational devices for the teaching of geography and astronomy and as furniture objects for lighting and decoration.

More precisely, these improvements relate to a special globe map of the type having means for simulating the illumination of the earth by the sun and for displaying the solar time.

2. Description of the Prior Art

A globe map is a special clock which has been described in many patents. Among them, mention may be made of French Pat. No. 1,425,541 (Dugardin—1964) which sets forth in detail the theoretical problems to be solved but describes an entirely mechanical, complex, expensive design which moreover has the drive outside the globe, thus making it considerably less attractive.

An electromechanical drive within the globe is described in U.S. Pat. No. 3,527,046 (Pawl—1970). In that patent, the means for simulating the lighting of the earth by the sun and for displaying the solar time include, within the translucent wall of the globe, a light source, a transparent hemispherical shell with numbered time zone lines, rotated by a day shaft arranged along the polar axis, a hemispherical screen mounted pivotally on bearings integral with said shell arranged in the plane of the equator and an electrical clockworks coupled with said day shaft and with the input of a reducer with a ratio of 1/365.

Thanks to this arrangement, the hemispherical screen driven by the transparent shell rotates at the rate of one revolution per mean solar day around the axis of the day shaft, thereby simulating the day and night lighting of the earth by the sun, while in the northern part of the illuminated terrestrial hemisphere, the solar time is indicated at all points. In addition, thanks to the 1/365 ratio of the reducer which drives a lug engaged in a circle-arc slot provided in the hemispherical screen, this screen oscillates about its pivot axis so as to cover alternately one polar circle and then the other in accordance with the seasons.

The latter globe clock however exhibits certain drawbacks and in particular the very approximate nature of the simulation of daily and annual movements of the earth, the lack of rigor and the complexity of the linkages used and, finally, the total absence of means for setting the day and time.

IDENTIFICATION OF OBJECTS OF THE INVENTION

It is the primary object of the present invention to provide a globe map with simulated sunlighting as representative as possible of reality.

A second object of the invention is to transform such a globe map into an original solar clock.

A third object of the invention is to provide such a globe clock with easily implemented means for setting the time and date.

A fourth object of the invention is to construct a globe map clock with simulated sunlighting and with the display of the solar time and day of the year, making use of simple, rigorous and inexpensive drive means.

A fifth object of the invention is to provide an electromechanical subassembly inexpensive to produce, utilizable as a basic component for the construction of advanced-design globe clocks as well as for the heliostat drives or for any other similar apparatus.

SUMMARY OF THE INVENTION

According to a first feature, the invention provides a globe map with simulated sunlighting, composed of a spherical shell with a translucent wall mounted on a support, said shell comprising internally a light source and a circular contour screen cooperating to create on said wall two substantially hemispherical zones respectively illuminated and dark, a day shaft arranged along the polar axis of the globe and rigidly connected to said shell and electromechanical clockworks connected to said screen and to said day shaft and designed to rotate said hemispherical zones around the center of said globe in accordance with the rhythm of the days and of the years. This globe map is characterized in that said clockworks comprise a body and two output shafts consisting of said day shaft and a year shaft arranged along a diameter of said circular contour and connected rigidly to said screen, the axes of said shafts intersecting substantially at the center of said spherical shell along an angle substantially equal to the angle of inclination of the plane of the equator on the ecliptic, said screen including a central cavity adapted to give free passage to said body during the rotation of said screen around the axis of said year shaft.

According to a second feature of the invention, such a globe map is further characterized in that said clockworks are adapted, under nominal operating conditions, firstly to rotate said screen and said shell in relation to each other at the rate of one revolution per sidereal day and, secondly, to rotate said screen around the axis of said year shaft at the rate of one revolution per tropical year.

Thanks to these arrangements, the illuminated hemisphere projected onto the wall of such a globe map, firstly, rotates around the polar axis at the rate of one revolution per mean solar day and, secondly, covers alternately one polar circle and the the other in rigorous accordance with the rhythm of the seasons.

In fact, knowing that a tropical year (time between two vernal equinoxes) includes substantially 366.25 sidereal days or 365.25 mean solar days, the opposite rotations of the day and year shafts of of the globe map according to the invention have the effect of driving the screen—and hence the illuminated hemisphere—around the polar axis of the globe at the rate of one revolution per mean solar day. In addition, as the annual movement of this illuminated hemisphere takes place at the rate of one revolution per tropical year around an axis really representative of the axis of rotation of the earth around the sun, the illumination of the earth by the sun is simulated at all times in strict accordance with reality by the improved globe map according to the invention.

According to a third feature of the invention, as the diameter of said circular contour is slightly smaller than the inner diameter of said shell, said screen has a main element and a complementary element respectively fixed at the two ends of said year shaft, said elements being separated from each other by a radial corridor adapted to give free passage to said day shaft during the rotation of said screen around the axis of said year shaft.

According to a characteristic complementing the preceding one, flexible opaque means are provide in said corridor to prevent the passage of light while allowing the passage of said day shaft.

Thanks to these arrangements, a very clear contrast is obtained between the respectively lit and dark hemispheres projected onto the wall of the spherical shell.

According to another important feature of the invention, such a globe map has a device for displaying the solar time and the day of the year, said device comprising projection means rigidly connected to said screen and arranged along the axis of its circular contour, said light source being rigidly fixed to said screen and cantilevered between the body of said clockworks and the input of said projection means, a transparent support bearing the design of a figure representing the sun being fixed at the inlet of said projection means, a circular band with a series of inscriptions placed in twelve successive areas respectively representative of the twelve months of the year and/or the twelve signs of the zodiac being arranged coaxially in relation to said year shaft, connected rigidly to the body of said clockworks by arms going around said light source, and adapter to go through the space between and said light source and the inlet of said projection means so that the inscriptions of a segment of said band are projected onto the wall of said shell in the vicinity and on either side of the projection of said figure.

Thanks to this arrangement, a figure simulating the sun appears at the center of the illuminated hemisphere of the improved globe map according to the invention, on the meridian where it is noon under the sun at the latitude which corresponds to the declination of the sun at that point. Further, inscriptions of months and days appear on either side of this figure, and the relative position of this figure and its inscriptions indicates the day of the month.

Such a globe map with simulated sunlighting provides the geography teacher with an effective, attractive educational instrument, and also provides an improved globe map clock and an original decorative-lighting means for use in apartment or an office. Travelers in an airport equipped with a large-diameter globe map according to the invention are offered an astronomic clock of a new type enabling them to estimate the solar time in any region of the world of interest to them, along with the sunlight conditions of that region.

According to another important feature of the invention, said clockworks comprise an electric motor of the stepping type supplied by a control circuit, said circuit being designed to produce control pulses either at a nominal working frequency or at a fast working frequency; the value of said fast working frequency may be several thousand times that of said nominal working frequency.

Thanks to this arrangement, it is possible in less than a half-hour to run the screen through a complete revolution around the axis of the year shaft, thereby simulating the phases of the days and months of a whole year. Thus, the setting of the time and day of the globe clock according to the invention is an operation easily carried out by anyone.

According to a further feature of the invention, said clockworks include, on the one hand, a movement comprising a stepping motor coupled to a reducer driving an intermediate shaft, said motor being supplied by a control circuit and, on the other, a reduction gear box comprising first and second gears with ratios of 1/N and 1/M respectively, said intermediate shaft is connected to said day and year shafts by said first and second gears respectively, said clockworks movement is adapted to rotate said intermediate shaft at the rate of N revolutions per average solar day under the action of control pulses of period P, the value of the ration 1/M is equal to $1/(366.25 \times N)$ and said control circuit is designed to generate control pulses under nominal working conditions with a period equal to $P \times (365.25/366.25)$.

Thanks to these arrangements, in an improved globe map clock according to the invention, the simulated sunlighting as well as the display of the day and the year are obtained under rigorous conditions, with simple drive means, reliable operation and low cost.

BRIEF DESCRIPTION OF THE DRAWINGS

The features and advantages of the invention will appear more precisely from the following description of a particular embodiment given with reference to the appended drawings in which:

FIG. 1 represents a cutaway view of an improved globe map clock according to the invention;

FIG. 2 represents a detail of the inscriptions of the calendar;

DETAILED DESCRIPTION OF THE INVENTION

Figure 3A:
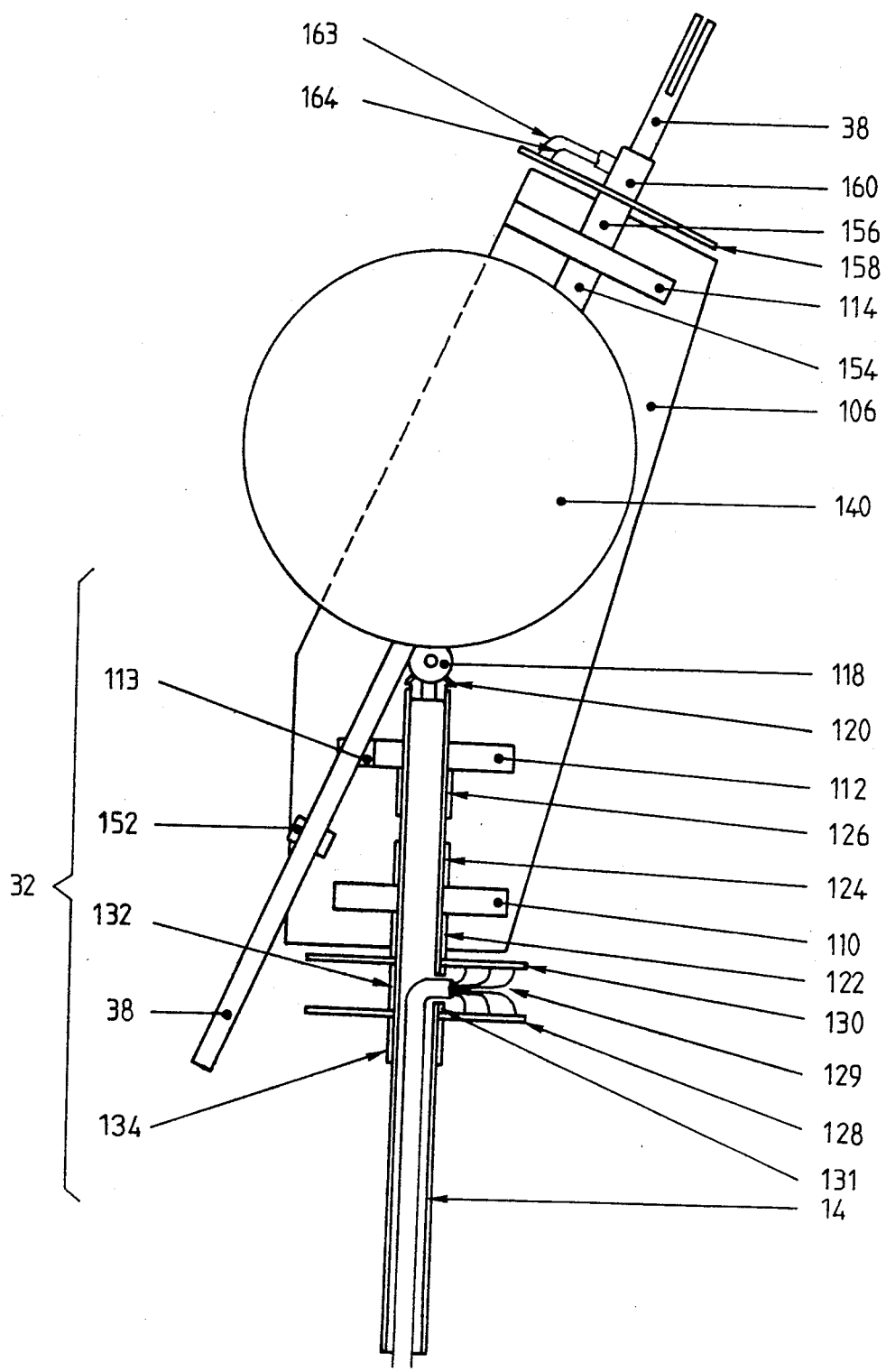
FIGS. 3A and 3B represent a front view and a side view in section of the electromechanical subassembly of said globe.

According to FIG. 1, a globe map clock 10 first of all includes a spherical shell 12 with a translucent wall comprising a tracing of the continents and characteristic circles. The shell 12 is made up of two northern and southern half-shells respectively, secured to each other by transparent adhesive tape bearing a relatively thick longitudinal line representing the line of the equator and masking the connection between the half-shells. The shell 12 is secured rigidly at its south pole to a hollow polar shaft 14. The lower end of this shaft 14 is pivotally mounted with friction in a recess 16 provided in the southern branch of a meridian arc 18 whose northern branch is equipped with a lug 20 engaged in a hole-bearing 22 pierced at the north pole of the shell 12. On the shell 12 are also represented the north pole circle 24, the tropics 26 and 28 and the equator 30, the continents being omitted in order to simplify the drawing.

Inside the shell 12 is provided an electromechanical subassembly 32 consisting of an electric clockworks movement 34 and a reduction gear box 36. This box 36 has two output shafts, namely the hollow polar shaft 14, called the day shaft, and a hollow year shaft 38. The axes of these two shafts 14 and 38 are concurrent with the center C of the spherical shell 12 along an angle substantially equal to the angle of inclination of the plane of the equator on the ecliptic (namely 23 degrees 27 minutes). The box 36 has gears (shown in detail below in FIG. 3) which establishes a reduction ratio of 1/366.25 between the rotating speed of the day shaft 14 and the year shaft 38.

The end of the hollow shaft 14 bears on a shoulder 40 of the recess 16. The meridian arc 18 has a hollow base 42 rigidly secured to the baseplate 44 of the globe 10. The southern branch of the arc 18, in its section between the recess 16 and the base 42, is also hollow so as to provide a passage for electric wires from the inside of the shell 12 up to the baseplate 44 through the day shaft 14, the bottom of the recess 16, the arc 18 and the base 42.

Inside the shell 12 is also provided a hemispherical screen 46 whose diameter is slightly smaller than the internal diameter of the shell 12. The inside of the screen 46 has a hemispherical cavity 48 at its center and a ring area 50, the width of this area being about one-third of the radius of the screen. The screen 46 is made of a lightweight opaque material (expanded polystyrene, for example).

At the ends of the year shaft 38 are welded two attachment plates 52 and 54. The northern plate 52 is bonded on the peripheral surface of the main element 56 of the screen 46 and the southern plate is bonded to the complementary element 58 of this screen, the shaft 38 being arranged along the axis of symmetry common to these two screen elements. The two screen elements 56 and 58 are separated from each other by a radial corridor 60 with walls of revolution around the axis of the shaft 38. The southern part of the corridor 60 is closed off by two flexible opaque joints 62 and 64 made up of two brushes in the form of half-rings facing each other and interpenetrating each other slightly, secured on the walls of this corridor. The outside of the screen 46 and the walls of this corridor 60 are painted matt black, the inside (ring 50 cavity 48) being in a reflecting light color.

On the attachment plate 52 of the main element 56 of the screen 46 is rigidly secured, by gluing or riveting for example, the foot 66 of a jib 68 whose upright 70 forms an angle of about 45 degrees with the year shaft 38, the cross-member 72 of the jib 68 being parallel to this shaft. To the middle of the upright 70 is rigidly secured the socket 74 of a fluorescent tube 76 in the form of a very elongated U cantilevered along a line parallel to the axis of the year shaft 38. To the end of the cross-member 72 is rigidly secured, through the middle, an optical conduit 78 whose inlet 80 and outlet 82 are respectively very close to the fluorescent tube 76 and to the inside wall of the shell 12, whose internal diameter is slightly greater than the total width of the tube 76 and whose axis coincides with the axis of the hemispherical screen 38. In the middle part of the conduit 78 is provided a convex lens 84 with a high magnification. At the inlet 80 of the conduit 78 is fixed a transparent plastic disk 86 in the center of which is drawn a figure 88 representing the sun (see FIG. 2).

Between the fluorescent tube 76 and the disk 86 is provided a narrow passage 90 occupied by a cylindrical segment belonging to a circular band 92 arranged coaxially in relation to the year shaft 38. The band 92 is mounted on a ring 94 to which are welded four arc arms (such as 96 and 98) designed to go around the free end of the fluorescent tube 76 and rigidly connected to the reduction gear box 36, so that the plane of longitudinal symmetry of this band 92 goes through the center C of the globe 10. The radius of the ring 92 is notably smaller than that of the hemispherical cavity 48.

The circular band 92 is made of semi-rigid transparent plastic. It bears inscriptions and calendar marks, namely twelve successive areas respectively representative of the months and days (with 28.25 days for February) and/or the signs of the zodiac.

FIG. 2 represents the inscriptions on the circular band segment placed at a given moment in the passage 90 and, superposed, the figure representing the sun drawn on the transparent disk 86.

Figure 3B:
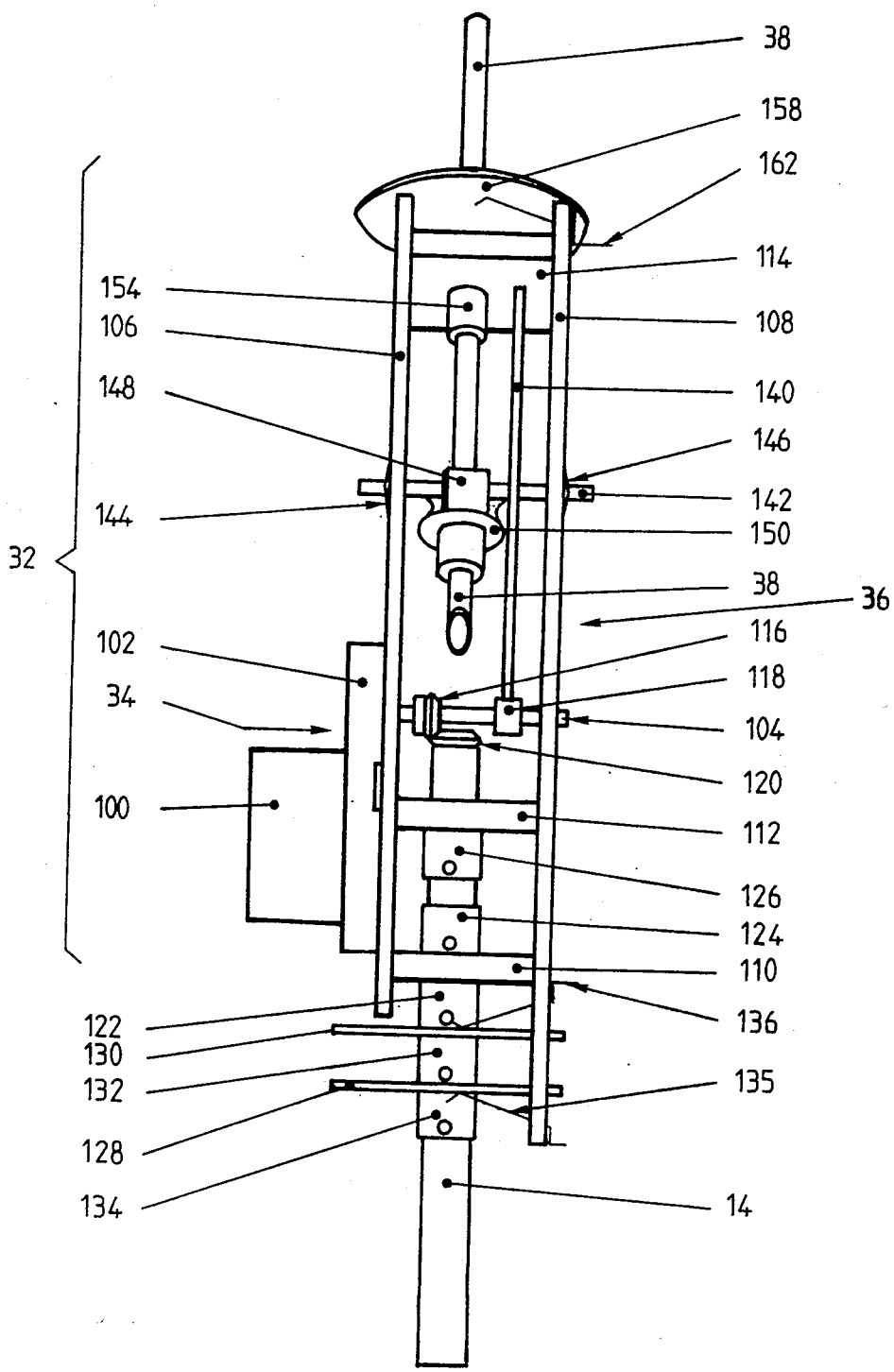

According to FIGS. 3A and 3B, the electromechanical subassembly 32 includes the clockworks movement 34 and the reduction gear box 36. The movement 34 consists of a stepping motor 100 making one revolution for 48 control pulses, associated with a reducer 102 with a ratio of 1/40, equipped with an output shaft 104. Under these conditions, the shaft 104 makes one revolution per average solar day when the motor is supplied by pulses whose period is 45 seconds. The reduction gear box 36 includes a body made up of two side plates 106 and 108 cut out of a plate of hard plastic, rigidly connected together by three spacers 110, 112 and 114 made of semi-hard plastic, to which the two side plates are secured by rivets.

To the output shaft 104 of the reducer 102 are rigidly secured a twenty-tooth bevel-gear pinion 116 and a twenty-four-tooth ring gear 118. The pinion 116 meshes with another twenty-tooth bevel-gear pinion 120 rigidly fixed to the upper end of the day shaft 14. The day shaft 14 is mounted rotatably in hole-bearings pierced in the spacers 110 and 112. Sleeves 122, 124 and 126 fixed by rivets to the hollow shaft 14 keep the shaft 14 in place while allowing a slight play between these sleeves and the spacers in order to allow the free relative rotation of the shaft 14 and of these spacers.

On the shaft 14 are placed two insulating disks 128 and 130 each having three circular conducting paths, not shown, these disks being kept in place by three sleeves 122, 132 and 134, the latter two sleeves being, like the preceding one, fixed by rivets to the hollow shaft 14. The six paths of these two disks 128 and 130 are connected by six conductors referenced globally 129 to six output terminals of the electric power supply of the globe which will be described below with reference to FIG. 4. These six conductors 129 come out of the hollow shaft 14 through an opening 131.

The side plate 108 differs from the side plate 106 notably in that it has, at the bottom, an L-shaped extension which provides in the side plate 108 a lateral rectangular cutout in which are engaged the disks 128 and 130.

On each of the upper and lower ends of this cutout are riveted three sliding contacts such as 136 and 138 which come into contact with the three conducting paths printed on the disks. The three sliding contacts in contact with the paths of the disk 128 and the central sliding contact associated with the disk 130 are connected respectively to four forward or reverse control wires of the stepping motor 100. To simplify the drawings, these wires are not shown.

The ring gear 118 meshes with a 293-tooth ring gear 140 connected rigidly to a shaft 142 mounted rotatably in two hole-bearings pierced in the side plates 106 and 108, this shaft 142 being kept in place by deformable elastic washers 144 and 146 force-fitted at its ends. To the shaft 142 is rigidly connected by means of a pin an endless screw 148 which meshes with a thirty-tooth gear 150 rigidly secured by rivets to the hollow year shaft 38. The year shaft 38 is mounted rotatably in two hole-bearings respectively pierced in the spacer 114 and in a smaller spacer 152 placed between the spacers 110 and 112 and riveted to the side plates 106 and 108. A C-shaped cutout 113 is moreover made in the spacer 112 to allow the free passage of the shaft 38.

The spacers 114 and 152 are placed between the side plates 106 and 108 and the hole-bearings are pierced in these spacers so that the axis of the year shaft 38 intersects that of the day shaft 14 at an angle substantially equal to 23 degrees 27 minutes. Moreover, the height of the shaft 14 inside the shell 12 is chosen so that the point at which the axes of the shafts 14 and 38 intersect is at the center C of this shell.

The year shaft 38 is kept in place in its hole-bearings by two sleeves 154 and 156 secured by rivets, a slight play being left between these sleeves and the spacer 114 so as to allow the free rotation of the shaft 38.

Bearing upon the sleeve 156 is provide an insulating disk 158 with three conducting paths, identical to the disks 128 and 130, and another sleeve 160 secured by riveting to the shaft 38 to keep the disk 158 securely fixed on this shaft.

On the upper edge of the side plate 108 are riveted two sliding contacts such as 162 which come into contact with the two paths farthest from the disk 158. These two sliding contacts are connected by two electric wires (not shown) to the two sliding contacts in contact with the two paths farthest from the disk 130.

The two paths farthest from the disk 158 are connected by two electric wires 163 and 164 to the terminals of the socket 74 of the fluorescent tube 76. These two wires go inside the hollow shaft 38 and run along the upright 70 of the jib 68.

Figure 4:
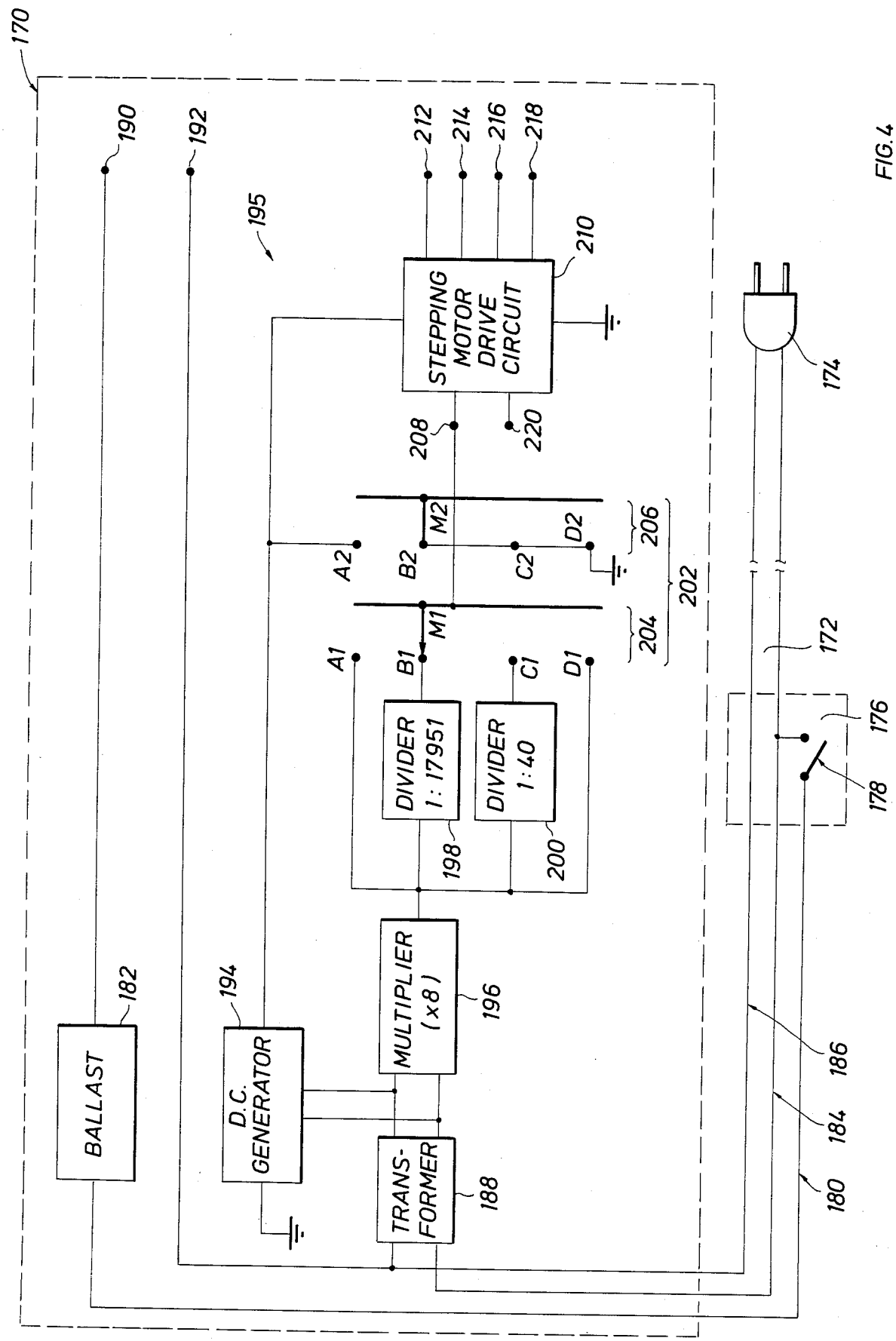
FIG. 4 represents the electric power supply diagram of the globe.

FIG. 4 represents the power supply diagram 170 of the electrical devices of the globe 10, installed in the baseplate 44. According to this figure, a cord 172 provided with a plug 174 intended to be plugged into a 220 V, 50 Hz power outlet is connected to a control button 176 used for lighting the fluorescent tube 76. For this purpose, a button 176 is provided with a switch 178 whose output is connected by a wire 180 to the input of the ballast 182 of the tube 76 and the input connected to one of the wires of the cord 172. The two wires of the cord 172 go through the button 176 without an electrical break and are connected by two wires 184 and 186 to the input of a stepdown voltage transformer 188.

The output of the ballast 182 and the wire 186 are connected to two terminals 190 and 192 to which are connected the two terminals of the socket 74 of the fluorescent tube 76. This double connection (not shown) is obtained through the two rotating contacts farthest from each of the disks 156 and 130, two connection wires going through the base 42, the southern branch of the meridian are 18, the bottom of the recess 16 and the day shaft 14, two others running along the side plate 108 and two others going through the year shaft 38 and running along the upright 70 of the jib 68.

The output of the transformer 188 is connected to the input of a DC voltage generator 194 delivering about 10 volts, used (by means of connection not shown) to supply the electronic circuits 195 which will now be described.

The output of the transformer 188 is also connected to the input of a frequency multiplier stage 196 with a multiplication factor of 8: at its output there thus appears a 400-Hz signal exhibiting the high long-term stability of the power line at 50 Hz. This 400-Hz signal is applied to the input of a first frequency divider stage 198 having a division factor of 17951: at its output there consequently appears a signal whose period is 44.8775 seconds which, with a precision better than $10^{-5}$, is the nominal period $Pn = (45 \times 365.25/366.25)$ seconds of control pulses of the clockworks movement 32.

This 400-Hz signal is also applied to the input of a second frequency divider stage 200 whose division factor is 40: at its output there consequently appears a signal whose period is 0.1 second.

These three signals are applied to a rotary switch 202 with four positions and two contact rings. The first contact ring 204 has four terminals referenced $A_1$, $B_1$, $C_1$ and $D_1$ and a mobile contact $M_1$, the second contact ring 206 has four terminals and a mobile contact identical to the preceding, referenced $A_2$, $B_2$, $C_2$, $D_2$ and $M_2$. The two moving contacts $M_1$ and $M_2$ are rigidly connected to a shaft integral with a control knob 45 mounted on the baseplate 44 of the globe 10.

The terminals $A_1$ and $D_1$ are connected to the output of the frequency multiplier stage 196, the terminal $B_1$ to the output of the frequency divider stage 198 and the terminal $C_1$ to the output of the frequency divider stage 200. The mobile contact $M_1$ is connected to the clock input terminal 208 of a drive circuit for a stepping motor 210 (such as the integrated circuit SAA 1042 made by the U.S. company Motorola Semiconductor Products Inc.) having four output terminals, 212, 214, 216 and 218 respectively connected to the four power supply wires of the two windings of the stepping motor 100. This connection with four wires (not shown) is made through the three rotating contacts of the disk 128 and the central rotating contact of the disk 130 and by means of four wires going through the base 42, the southern branch of the meridian arc 18, the bottom of the recess 16 of the day shaft 14.

The terminal $A_2$ is connected to the output of the DC voltage source 194 and the terminals $B_2$, $C_2$ and $D_2$ are connected to the ground. The mobile contact $M_2$ is connected to the input terminal 220 of the drive circuit 210. This terminal 220 is adapted according to whether it receives an 0 or 1 signal (zero and 10 volts in the present case) to produce, via said drive circuit 210, control pulses for the forward or reverse operation of the stepping motor 100.

Referring to the FIGS. 1 and 4, when the switch 202 is in position B, control pulses with a nominal period of $Pn = 44.8775$ seconds are applied for forward operation to the control wires of the stepping motor 100.

Under these conditions, the motor 100 drives the output shaft 104 of the associated reducer 102 at the speed of one revolution per sidereal day with a precision better than $10^{-5}$. Since two indentical bevel-gear pinions 116 and 120 respectively mounted fixedly on the shaft 104 and on the day shaft 14 mesh together, the unit made up of the clockworks movement 34, the reduction gear box 36, the circular band 92, the screen 46, the jib 68, the fluorescent tube 76 and the optical conduit 78 rotates at the speed of one revolution per sidereal day around the day shaft 14 mounted fixedly in the spherical shell 12. (It will be noted here that, owing to the distributions in space adopted, on the one hand, for the main element 56 of the screen 46 and, on the other, for the jib 68 equipped with the tube 76 and the conduit 78, good static balancing of masses in movement is achieved). During this daily rotation, each end of the axis of the year shaft 38 moves along a polar circle, and the screen 46 integral with the year shaft 38 carries out a fraction of a revolution (1/366.25) around the axis of this year shaft in the direction opposite the daily movement around the shaft 14.

Thanks to the combination of these two opposite movements, the hemisphere of the globe 10 delimited by the great circle surrounding the external contour of the screen 46, which is lit by the fluorescent tube 76 mounted on the reflecting front of the screen 46, carries out one revolution in a mean solar day (a tropical year is equal to 365.25 mean solar days), thereby simulating with good accuracy and a good contrast through the translucent wall of the shell 12 of the globe 10, the conditions of sunlight on the part of the earth exposed to the sun. Moreover, thanks to the small spacer existing between the circular contour of the screen 46 and the inner wall of the shell 12 as well as to the matt black color of the outside of the screen 46, the direct light from the tube 76 and the light reflected by the illuminated wall of the shell 12 are stopped so that a relatively dark hemisphere, clearly delimited by the great circle mentioned above, is also created on the globe 10. In addition, thanks to the matt black walls of the corridor 60 and to the presence of joint-brushes 62 and 64 which close it off, these same lights cannot go through this corridor and create semicircular light spots on the dark wall of the globe. One thus obtains good simulation of night-time conditions on the part of the earth not exposed to the sun.

The rotation of the screen 46 around the axis of the year shaft 38 has the effect of making the day shaft 14 come closer to this screen, to engage in the corridor 60, to advance in it while deforming the joint-brushes 62 and 64. and then to come out and move away from it. Hence, the angle formed by the axis of the day shaft 14 and the plane of the front of the screen 46 varies with the seasons from a zero value at the vernal and autumnal equinoxes up to extreme values of ±23 degrees 27 minutes, respectively positive and negative at the winter and summer solstices of the northern hemisphere of the globe 10. Under these conditions, the screen 46 covers alternately one polar circle and then the other during a period of rotation equal to a tropical year. The result of this annual rotation is that on the translucent wall of the globe 10 there is a simulation of illumination and hence of heating by the sun in the northern and southern hemispheres of the earth and notably in the polar regions with the seasons.

The rotations of the screen 46 around the day shaft 14 and the year shaft 38 lead to the daily and annual movement of the fluorescent tube 76 and of the projection device consisting of the optical conduit 78 and the lens 84. The figure representing the sun (see FIG. 2) drawn on the transparent disk 86 fixed at the inlet of the optical conduit 78 is consequently projected onto the wall of the globe 10 in the center of the illuminated hemisphere. This figure represents at all times the position of the sun at its zenith. The longitude of the center of this figure is at all times that of the terrestrial meridian in which it is noon under the sun. As regards its latitude, it is equal to the declination of the sun and varies with the seasons from line 13 of the Tropic of Cancer for the summer solstice of the northern hemisphere up to line 15 of the Tropic of Capricorn for the winter solstice, going through line 9 of the equator during the equinoxes.

The presence of a circular band segment 92 between the fluorescent tube 76 and the inlet of the optical conduit 78 allows the reverse projection of the inscriptions on this band onto the wall of the globe and on either side of the figure representing the sun. As the circular band 92 is rigidly connected to the electromechanical subassembly 32 and arranged coaxially in relation to the year shaft 38, the screen 46 driven by this shaft, as well as the tube 76 and the conduit 78 which are rigidly connected to it, rotate around the band 92 at the speed of one turn per tropical year. If the inscriptions of the band 92 have been suitably set in relation to a reference position of the screen 46 (an equinox, for example), the relative position of the figure of the sun and of the calendar inscriptions projected onto the wall of the globe constantly indicate the day of the month, provided that the globe clock has been set previously, as indicated below.

By means of such an improved globe map clock according to the invention, geography teachers can easily explain to pupils the effects of sunlight and hence of heat conditions on the earth resulting from the passing of days and seasons. It is then possible to turn the shell 12 and its entire contents manually between two swivelling points.

Such a globe of suitable dimensions installed in an airport could provide an original decorative element as well as a source of information; travellers can in fact consult the globe, thus transformed into an astronomical clock, in order to immediately estimate the solar time in each region of the world of interest to them and also determine sunlight conditions in the region at a given instant.

Further, as an item of furniture, such improved globe map clock with simulated sunlighting in accordance with the invention constitutes a particularly original means of lighting and decoration suited to apartments as well as to offices open to the public (traveling agencies, for example). In such a case, thanks to the switch 178 controlling the lighting of the fluorescent tube 76, it is possible to light up and extinguish the globe 10 as desired, while the clockworks of the globe continue to operate. The result is that, upon the lighting of the light source of an improved globe map clock according to the invention, the globe immediately shows an illuminated hemisphere simulating the instantaneous sunlighting conditions on the earth, while also indicating the time and the date.

With reference to FIGS. 3 and 4, when the two mobile contacts M of the switch 202 are connected to the two terminals B, forward operation control pulses with a nominal period of Pn are applied by the drive circuit 210 to the two windings of the stepping motor 100 and the output shaft 104 of the clockworks movement 34 advances by one turn per sidereal day. As there are 366.25 sidereal days in a tropical year, it is necessary to divide by 366.25 the speed of rotation of the axis 104 to obtain the speed of the year shaft 38. This ratio is also written: 293×5/4. The 24-tooth wheel 118 which meshes with the 293-tooth wheel 140 and the endless screw 148 integral with the wheel 140 which drives the 30-tooth wheel 150 cooperate to give this ratio: the year shaft 38 makes a complete revolution in a tropical year.

By placing the two mobile contacts M of the switch 202 on the terminals D, forward operation control pulses of a period equal to 2.5 ms are applied by the drive circuit 210 to the two windings of the stepping motor 100. Under these conditions, the output shaft 104 of the clockworks movement advances by one turn every 4.8 seconds and the year shaft 38 makes one turn in 29.3 minutes. Thanks to this very fast rotation, it is easy, by reading the calendar projected on the wall of the shell 12, to set the date of the globe clock 10. To further reduce this date resetting time, one need only place the mobile contacts of the switch 202 on the terminals A. In this case, the drive circuit 210 delivers reverse operation control pulses to the two windings of the motor 100. The motor then reverses at the preceding very fast rate, making it possible to halve the maximum resetting time of the calendar.

As soon as the date of the globe clock 10 has been set, the mobile contacts of the switch 202 will be placed on the terminals C. In this case forward operation control pulses with a period equal to 0.1 second are applied by the drive circuit 210 to the two windings of the motor 100 and the shaft 104 then makes one turn in slightly more than three minutes. The setting of the precise solar time on the globe clock 10 is thus done without difficulty. One need then only switch the mobile contacts M and place them on the terminals B so that the motor 100 receives forward operation control pulses having a nominal period and so that the globe clock 10 indicates at all times the solar time, the month and the day of the month.

Thanks to these fast and very fast rotations respectively, a geography teacher has an improved globe map clock according to the invention enabling him, during a course, to easily explain to his students the movements of the earth's rotation about itself and around the sun. Similarly, the possibility of a daily rotation reduced to three minutes further enhances the value of the improved globe clocks according to the invention used for lighting and decoration in apartments and offices.

The embodiment of the invention described above as a non-limitative example allows for many variations. One variation will consist in using a quartz clock instead of the described electric power supply producing pulses with a frequency derived from that of the power line.

Another will consist in rigidly connecting the reduction gear box to a polar shaft internal to the day shaft, said polar shaft being mounted fixedly (or pivotally with friction so as to allow manual rotation of the spherical shell and of its contents) in the recess provided at the southern end of the meridian arc, and rotating the day shaft around this polar shaft and the spherical shell around the screen. Such a polar shaft will be hollow to allow passage of electric wires for the power supply of the motor and the light source and the disks with sliding contacts mounted on the day shaft will no longer be necessary and will be eliminated.

Another variation will consist in suspending the globe clocks instead of mounting them on a baseplate. This variation is particularly suited to globe clocks of large size used for the decoration of public places, airports, technical museums or shopping malls, for example.

Another variation will consist in rotating the output shaft of the clockworks movement at the rate of N revolutions per sidereal day instead of one, the reduction ratios of the gearing in the reduction gear box being modified accordingly.

Another variation will consist in replacing the second gearing which drives the year shaft by a second clockworks movement supplied by pulses with a frequency $366.25 \times N$ times lower on the average than that which supplies the first clockworks movement integral with the day shaft. This variation—which is suited to large globes—makes it possible to take into account the irregularities in the rotation of the earth around the sun by varying said frequency according to said irregularities.

It will also be noted that the economic conditions for the manufacture of a globe map clock according to the invention may lead a supplier of the manufacturer of such a globe to manufacture and market, as a basic component of such a globe, an electromechanical subassembly including the clockworks movement 34 and the reduction gear box 36. A manufacturer of heliostats will be able to use such a subassembly available on the market as a drive for heliostats and for any other similar apparatus.

The following claims have been drawn up to cover the different aspects of the embodiment of the invention described above and the different variations, whether or not degraded, which may be applied to it while remaining within the framework of the invention.

What is claimed is:

1. A globe map with simulated sunlighting comprising a spherical shell with a translucent wall mounted on a support, said shell having an internal light source and a circular contour screen cooperating to create on said wall two substantially hemispherical zones respectively illuminated and dark and electromechanical clockworks designed to rotate said hemispherical zones around the center of said globe in accordance with the rhythm of the days and of the years, said clockworks having a body and two output shafts including a day shaft arranged along the axis of the poles and rigidly connected to said shell and a year shaft arranged along a diameter of said circular contour screen and rigidly connected to said screen, the axes of said shafts intersecting substantially at the center of said spherical shell along an angle substantially equal to the angle of inclination of the plane of the equator on the ecliptic, said screen comprising a central cavity designed to allow free passage of said body during the rotation of said screen around the axis of said year shaft.

2. The globe map of claim 1 wherein said clockworks are adapted, under nominal operating conditions, firstly to rotate said screen and said shell in relation to each other at the rate of one revolution per sidereal day and secondly, to rotate said screen around the axis of said year shaft at the rate of one revolution per tropical year.

3. The globe map according to claim 1 wherein the diameter of the circular contour of said screen is slightly smaller than the diameter of said shell, said screen has a main element and a complementary element respectively fixed at the two ends of said year shaft, said elements being separated from each other by a radial corridor adapted to give free passage to said day shaft during the rotation of said screen around the axis of said year shaft and wherein said corridor comprises flexible opaque means for preventing the passage of light while allowing the free passage of said day shaft.

4. The globe map of claim 3, further comprising a device for displaying the solar time and the day of the year, said device having projection means rigidly connected to said screen and arranged along the axis of its circular contour, said light source being rigidly fixed to said screen and cantilevered between the body of said clockworks and the inlet of said projection means, a transparent support bearing the design of a figure representing the sun being fixed at said inlet, a circular band with a series of inscriptions placed in twelve successive areas respectively representative of the twelve months of the year and/or the twelve signs of the zodiac being arranged coaxially in relation to said year shaft, connected rigidly to the body of said clockworks by arms going around said light source, and adapted to go through the space between said light source and said inlet so that the inscriptions of a segment of said band are projected onto the wall of said shell in the vicinity and on either side of the projection of said figure.

5. The globe map clock of claim 4 wherein the main element of said screen is fixed in its middle part to the end of the year shaft opposite the day shaft and wherein the foot of support means inclined toward said year shaft is fixed to said middle part, said support means carrying the socket of said light source and an optical conduit equipped with a convex lens, said source being of elongated form and arranged parallel to said shaft.

6. The globe map of claim 2 wherein said clockworks are formed, on the one had, by a clockworks movement comprising a stepping motor coupled to a reducer driving an intermediate shaft, said motor being supplied by a control circuit and, on the other, a reduction gear box comprising first and second gears with ratios of 1/N and 1/M respectively, said intermediate shaft is connected to said day and year shafts by said first and second gears respectively, said clockworks movement is adapted to rotate said intermediate clock at the rate of N revolutions per mean solar day under the action of control pulses of period P, the value of the ratio 1/M is equal to $1/(366.25 \times N)$ and said control circuit is designed to generate control pulses under nominal working conditions with a period equal to $P \times (365.25/366.25)$.

7. The globe map of claim 6 wherein the second gearing of the reduction gear box has three ring gears, the first ring gear is rigidly connected to said intermediate shaft and has a number of teeth 4A, the second ring gear is rigidly connected to an endless screw, has 293 teeth and meshes with said first ring gear, and the third ring gear is rigidly connected to said year shaft, has a number of teeth equal to 5NA and meshes with said endless screw.

8. The globe map of claim 1 wherein said day shaft is mounted on said support, the body of said clockworks is adapted to rotate around said day shaft at the rate of one revolution per day and to cause the rotation at the same rate of said screen within said shell, said day shaft moreover being, if necessary, mounted pivotally with friction in said support so as to allow turning by hand by action on said shell.

9. The globe map of claim 1 wherein, with the body of said clockworks being rigidly connected to a polar shaft mounted on said support, said clockworks are designed to rotate said day shaft around said polar shaft and said shell around said screen, said polar shaft moreover being, if necessary, mounted pivotally with friction in said support so as to allow turning by hand by action on said shell.

10. The globe map of claim 3 wherein said light source is fixed on a support rigidly bonded to said screen and set in order to be crossed by the axis of said circular contour of said screen and means for constituting a figuration of the sun are fixed to said support and arranged to be crossed by said axis in order to project an image of the sun on said spherical shell.

11. The globe map of claim 2 wherein said clockworks comprises an electric motor of the stepping type supplied by a control circuit, said circuit being designed to produce control pulses either at a nominal speed frequency or at a fast speed frequency, the value of said fast speed frequency being capable of reaching several thousand times that of said nominal speed frequency.

12. The globe map of claim 11 wherein said control circuit comprises a stepping motor drive circuit, circuits producing a signal with a nominal speed frequency and signals with fast and very fast speed frequencies whose respective values are equal to a few hundred times and a few tens of thousands of times said nominal speed frequency, and switching means for applying a rotation direction control signal as well as said nominal, fast and very fast speed frequency signals to said drive circuit.

* * * * *